United States Patent Office 3,365,285
Patented Jan. 23, 1968

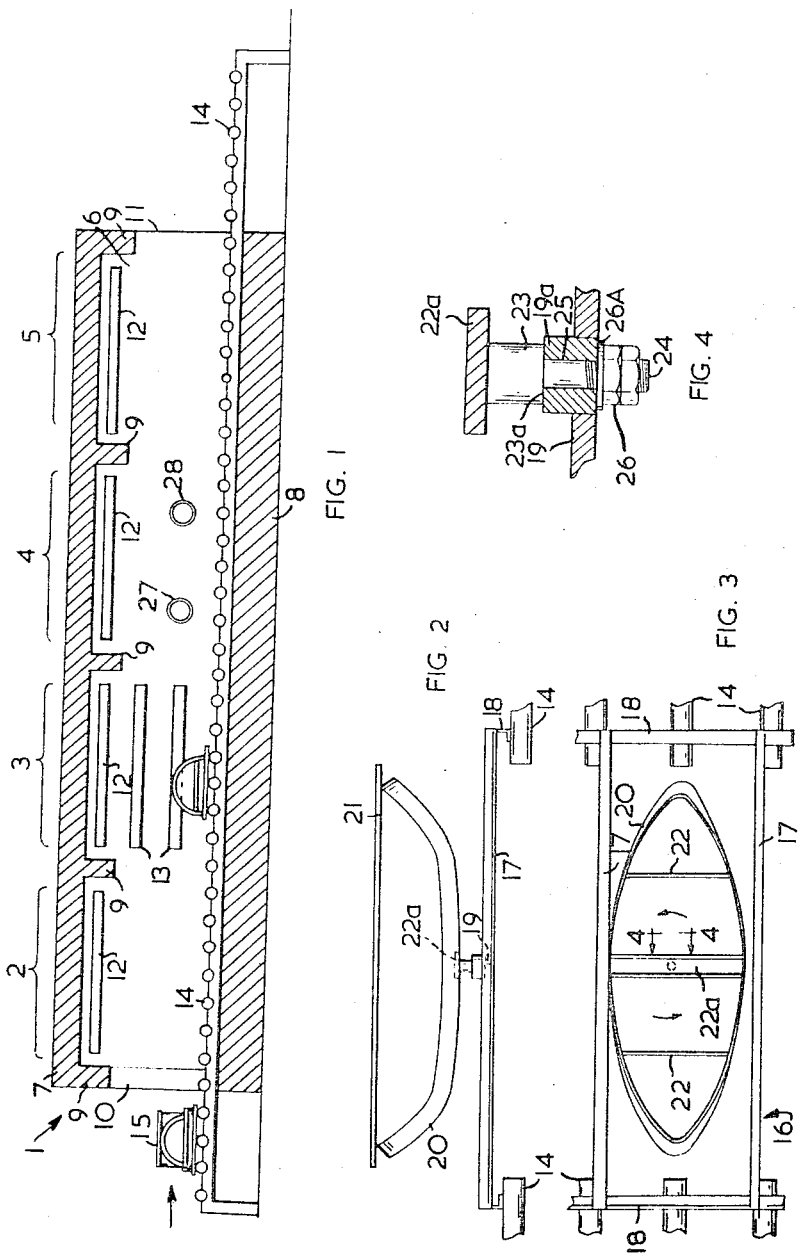

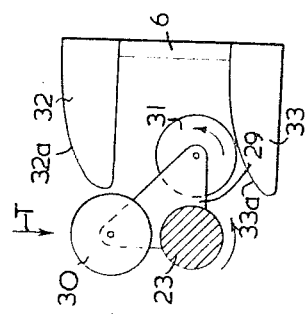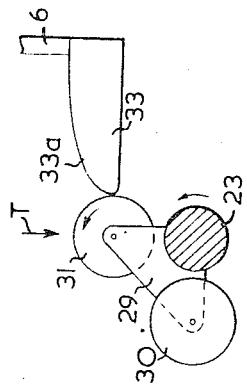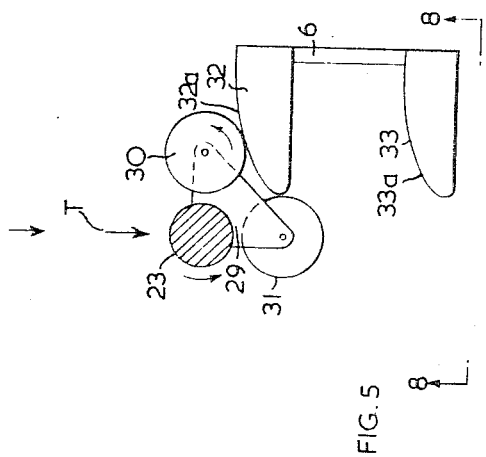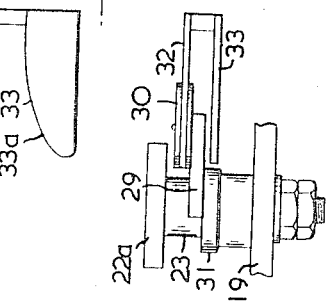

3,365,285
GLASS BENDING STRESS EQUALIZATION
METHOD
Ronald E. Richardson, Oshawa, Ontario, Canada, assignor to Pittsburgh Plate Glass Company, Pittsburgh, Pa.
Filed Apr. 13, 1964, Ser. No. 359,150
Claims priority, application Canada, Nov. 27, 1963, 890,013
8 Claims. (Cl. 65—104)

ABSTRACT OF THE DISCLOSURE

Improved methods of increasing the compressive stress of the trailing edge of a sheet of glass relative to the compressive stress in the leading edge of the sheet in a bending method which includes supporting the sheet on a shaping surface and passing the assembly of the sheet and shaping surface successively through a bending zone, an initial cooling zone and an annealing zone. The described methods are:
(1) rotating the sheet about a vertical axis
  (a) in the initial cooling zone,
  (b) in the initial cooling zone and the annealing zone,
  (c) in the glass bending zone only,
  (d) rotating the sheet in the bending, initial cooling and annealing zones.
(2) reciprocating the glass sheet such that the reciprocation is:
  (a) from the initial cooling zone to the bending zone,
  (b) entirely within the bending zone.
(3) causing the sheet to pause in its path of travel
  (a) when the sheet is entirely within the bending zone,
  (b) when trailing edge only of glass is in the bending zone.

The present invention relates to an improved method for bending and annealing glass sheets.

Present methods for the production of bent glass sheets, such as those used in the automobile industry, generally involve placing the sheets on molds having shaping surfaces of skeleton outline and passing the assemblies of the sheets and the molds through a tunnel-like bending lehr within which the glass is heated to bending temperature and sags under the influence of gravity, thereby acquiring a curvature conforming to that of the shaping surface.

For the formation of relatively complicated bends, the molds are divided into sections each of which constitutes a portion of the shaping surface. These sections are movable relative to one another into a spread or open mold position for receiving a glass sheet and tend to move into a closed mold position in which they combine to provide a substantially continuous skeleton shaping surface conforming in elevation and outline to the curvature desired for the bent sheets. When producing simple bends subdivision of the mold into sections is not necessary and the shaping surface is of a fixed construction.

The glass sheets used in the production of automobile windshields and rear windows are of an elongated nature. According to present practice, the sheets are mounted on molds of the kind mentioned above and are conveyed through a tunnel-like bending lehr with their longest dimension extending transversely of the direction of travel through the lehr.

The lehr includes a number of zones at different temperature, namely a pre-heating zone within which the temperature of the glass is raised from room temperature to a temperature approaching the bending temperature, i.e., the softening point of the glass, a bending zone wherein the temperature is further raised, so that the whole of the sheet is exposed to bending temperature, with application of especially intense heat to any regions of the sheet which are to be more severely bent than other regions, an initial cooling zone wherein the temperature of the sheet is reduced from the bending temperature to the upper limit of the annealing range, an annealing zone wherein the sheet is gradually cooled through the annealing range for the purpose of relieving stresses which have been set up during the bending operation and a final cooling zone wherein the glass finally reaches or approaches room temperature.

Commonly, the initial cooling zone is not distinguished as a separate entity from the annealing zone but is merely regarded as the initial portion of the annealing zone. The temperature of the bending zone depends to some extent on the nature of the glass but is normally in the range of from 950 to 1200° F. The temperature of the annealing zone is normally from about 1050 to 950° F., decreasing in the direction of travel of the glass sheet through the lehr.

In the bending zone the temperature of the glass sheet is raised above the softening point of the glass so that it sags downwardly into conformity with the shaping surface. During the cooling following this operation, random stresses are set up within the glass, particularly at regions of the sheet where a complex curvature is imparted to the sheet. A main purpose of subsequently passing the sheet through the annealing zone is to eliminate or reduce such random stresses in the sheet.

In addition to eliminating or reducing these random stresses during the annealing operation, it is desirable to promote the formation of certain specific stresses for the purpose of improving the edge strength of the sheet. If it can be arranged that upon passage of the glass sheet through the initial cooling zone the edges of the sheet are cooled more rapidly than the center of the sheet, so as to bring the marginal edge of the sheet below the glass annealing range sooner than the center portion of the sheet, the marginal edge of the sheet will then be subjected to compression during subsequent cooling of the center of the sheet, and the supporting mold, thereby producing a sheet with a toughened marginal edge.

In the conventional method of bending and annealing a glass sheet, the desired result of obtaining a sheet with a toughened marginal edge is usually satisfactorily achieved insofar as the edge of the sheet is concerned which constitutes the leading edge of the sheet during progress thereof through the bending and annealing lehr. However, such satisfactory results are not achieved in respect of the trailing edge of the sheet, and it is found that this edge has a considerably lower strength than the leading edge of the sheet.

A consideration of the heat transfer conditions prevailing during the passage of the glass sheet through the annealing zone suggests a reason for this difference between the strength of the leading and trailing edges of the sheet. As the sheet moves through the annealing zone, cooling of the leading edge of the sheet takes place by way of all of the three surfaces bounding this edge of the sheet, i.e., the upper and lower surfaces of the sheet and the edge surface of the sheet. The edge surface of the sheet is moving directly against the relatively cool atmosphere in the annealing zone and there is also continuous disturbance of this atmosphere so that there is efficient heat exchange at this surface.

Similarly efficient heat exchange takes place at the upper and lower surfaces bounding the leading marginal edge of the sheet.

No portion of the sheet other than the leading marginal edge can, theoretically at least, ever be exposed to such favourable cooling conditions since the other portions of the sheet do not have the advantage of having heat withdrawn from them through a surface at which the heat transfer characteristics are as good as those prevailing at the edge surface of the leading marginal edge. The remaining portions of the sheet move into regions of the annealing zone which have just previously been traversed by the leading marginal edge of the sheet and have thereby been temporarily raised to a temperature greater than that prevailing in these regions before the arrival of the sheet.

So far as the center of the sheet is concerned this is all to the good since it is desirable that the rate of cooling of the center of the sheet should be lower than that exerted on the marginal edges of the sheet in order that these edges may be put into compression during the subsequent overall cooling of the sheet. With respect to the trailing edge of the sheet, however, the situation is considerably less satisfactory.

Ideally, the trailing edge of the sheet should be cooled at the same rate as the leading edge of the sheet so as to obtain an end product which has a marginal edge of substantially uniform toughness. It may, indeed, be thought surprising that in the method of the prior art, any success at all has been achieved in promoting toughness in the edge of the sheet which was the trailing edge during the passage of the sheet through the annealing zone.

The air surrounding the trailing marginal edge has suffered localized heating not only due to passage therethrough of the leading marginal edge of the sheet, but also due to the passage of all parts of the sheet other than the trailing marginal edge. It might, therefore, be expected that the trailing marginal edge would be actually cooled less rapidly than the center portion of the sheet, so that instead of producing a finished sheet in which the trailing marginal edge is in compression, the trailing marginal edge would be in tension. That this is not normally the case may perhaps be due to air circulation characteristics adjacent the marginal edge of the glass sheet. Furthermore, the supporting surface thermally ballasts the glass in direct contact with it. The extreme edge which projects beyond the supporting surface and therefor, cools slightly faster than the ribbon of glass immediately in contact with the supporting surface. This effect however is normally quite minor.

The trailing marginal edge does have some advantage over the center part of the sheet in that withdrawal of the heat from the trailing marginal edge takes place not only through the upper and lower surfaces of this edge, but also through the edge surface. However, the heat transfer conditions at this edge surface are clearly not as good as those prevailing at the corresponding edge surface of the leading marginal edge.

Whereas the edge surface of the leading marginal edge is continually disturbing the atmosphere as it advances through the annealing zone the trailing marginal edge is moving away from the atmosphere in contact with it so that the formation of a dead space immediately behind the edge surface of the trailing marginal edge is to be expected, and this is not conducive to good heat transfer. Nevertheless, some cooling of the marginal edge will take place through the edge surface, and it may be presumed that this cooling, is sufficient to effect a faster cooling of the marginal edge than of the center portion of the sheet. However, the heat transfer conditions prevailing at the trailing marginal edge are clearly less efficient than those at the leading marginal edge, and this difference is manifested in the character of the bent sheets produced by the methods of the prior art which, as mentioned above are less than satisfactory in that the trailing edge of the sheet is found to have unacceptably less strength than the leading edge of the sheet.

In the foregoing discussion it has been tacitly assumed that when the glass sheet enters the initial cooling zone the leading and trailing edges are at the same temperature. Actually this will not in general be the case because during passage of the sheet through the bending zone there is differential heating of the leading and trailing edges for reasons analogous to those which give rise to differential cooling of the leading and trailing edges in the annealing zone. Therefore, when the sheet enters the initial portion of the annealing zone, the leading edge will be hotter than the trailing edge. This is an additional reason why an unequal rate of chilling of the leading and trailing edges takes place in the annealing zone.

The present invention is based on the recognition that the differential toughening of the leading and trailing edges of a glass sheet which is encountered with the methods of the prior art arises because the leading edge is heated to a higher temperature than the trailing edge which the sheet is in the bending zone and is then more effectively cooled than the trailing edge while the sheet is in the annealing zone.

It is an object of the present invention to provide an improved method for bending and annealing a glass sheet according to which the edge of the sheet which constitutes the original trailing edge is caused to be more satisfactorily strengthened than has been the case with the methods of the prior art.

Broadly speaking the method of the invention comprises increasing the rate of cooling of the original trailing edge of the sheet while the sheet is within the initial cooling zone and the annealing zone over that which would be achieved by continuously advancing the sheet through the bending zone, the initial cooling zone and the annealing zone while maintaining the original leading edge as the leading edge throughout all of said zones.

The method of the invention may be accomplished by controlling the movement of the sheet within the initial cooling zone and the annealing zone in such manner as to cool the original trailing edge in a more effective manner than is achieved by continuously advancing the sheet through the initial cooling zone and the annealing zone while maintaining the initial leading edge as the leading edge throughout those zones. Alternatively, or additionally, the movement of the sheet in the bending zone may be controlled so as to heat the original trailing edge more effectively than is achieved by continuously advancing the sheet through the bending zone while maintaining the original trailing edge as the leading edge throughout that zone.

According to one embodiment of the present invention, rotation of the sheet about a substantially vertical axis through an angle of at least 180° is effected while the sheet is within the initial cooling zone. If desired, this rotation, which for convenience will normally be about an axis passing through the center of gravity of the assembly of the sheet and the bending mold, may proceed continuously during the entire time taken for the sheet to pass through the initial cooling zone and the annealing zone. However, for practical purposes it is often sufficient merely to effect rotation of the sheet once through an angle of 180° just after entry of the sheet into the initial cooling zone. As is well known, it is a preferred practice in the bending art to arrange that the initial cooling zone effects a sharp drop in temperature of the sheet as it leaves the bending zone with the object of arresting, as quickly as possible, sagging of the glass which at the end of the bending zone has acquired the desired curvature defined by the shaping surface upon which the sheet is supported. Therefore, upon entry of the sheet into the initial cooling zone there is a sharp chilling of the leading edge of the sheet. Accordingly, such benefit can be derived by arranging that the sheet is rotated once, shortly after its entry into the initial cooling zone.

By adopting this expedient a new chilling sequence is obtained. The leading edge of the sheet is first sharply chilled. Rotation of the sheet through about 180° then takes place. This has the effect of bringing the trailing edge of the sheet into a position where it becomes the leading edge and is exposed to a severe chilling action almost as great as that to which the original leading edge was subjected. The disturbance of the atmosphere in the initial cooling zone which is caused by the rotation of the assembly of the sheet and the bending mold promotes dispersal of the overheated localized atmosphere formed during the chilling of the original leading edge. After such rotation of the sheet through 180° the assembly of the sheet and the mold can then be passed on through the annealing zone in conventional manner. Since the original trailing edge has now become the leading edge it will be subjected during the rest of the passage through the annealing zone to a more severe chilling action than the original leading edge which has now become the trailing edge. However, the extra toughness which is imparted to the original trailing edge as a result of this will generally make up for the fact that the original leading edge has been preferentially toughened during its initial exposure to the cooler atmosphere within the initial cooling zone. In cases where this is not so and the original leading edge is found to have been insufficiently toughened the balance can be redressed by effecting a further rotation of the sheet through 180°, or a number of such further rotations, during the movement of the sheet through the annealing zone. Routine experiment is all that is necessary in order to arrive at a sequence of rotation which yields a sheet having edges which have been satisfactorily toughened.

According to a further embodiment of the invention, rotation of this sheet may be dispensed with and an increased rate of cooling of the original trailing edge of the sheet be achieved by effecting a reciprocating movement of the sheet just after it has emerged from the bending zone and has been subjected to an initial cooling in the initial cooling zone. The purpose of such reciprocation is to move the sheet backwardly from the initial cooling zone so that it is returned to the bending zone. The reciprocation of the sheet backwardly is preferably only sufficient to effect re-exposing only the trailing edge portion of the sheet of glass to the elevated temperatures of the bending zone. After the sheet has moved backwards for a short time in the bending zone it is caused to move back again into the initial cooling zone and from then on follows a conventional pattern movement through the annealing zone. By selecting a suitable time of reverse travel of the sheet in the bending zone when it has been returned thereto from the initial cooling zone the effect of this procedure is to increase the relative rate of cooling of the original trailing edge of the sheet. During the time that the sheet makes the initial entry into the initial cooling zone the cooling conditions are exactly the same as those prevailing in the method of the prior art. Thus, the original leading edge of the sheet is preferentially cooled while a lesser degree of chilling takes place at a trailing edge. Accordingly, immediately prior to the return of the sheet to the bending zone the original leading edge is at a lower temperature than the original trailing edge. It follows that upon return of the sheet to the bending zone the trailing edge will be raised to a temperature more nearly approximating the bending temperature than will the leading edge. At the same time, the withdrawal of the sheet from the annealing zone permits the original thermal equilibrium within the initial cooling zone to be restored so that the conditions therein are substantially restored to those prevailing prior to the initial introduction of the sheeting to the initial cooling zone. Thus, upon the return of the sheet to the initial cooling zone the trailing edge will suffer a degree of chilling greater than that experienced by the leading edge and considerably greater greater than that which would be experienced by the trailing edge if it had simply been caused to continue through the initial cooling zone in the manner traditional in the prior art. The distance which the sheet travels back-
wardly within the bending zone after being returned thereto is determined by practical experience. It is, of course, desirable that this time should not be so great as to reheat any portion of the glass sheet to above the bending temperature, since this would give rise to the danger of undesirable deformation of the sheet.

The two embodiments referred to above are concerned with controlling the movement of the sheet within the initial cooling zone. As previously noted, however, it is also possible to achieve the object of the invention by controlling the movement of the sheet within the bending zone.

For example, the sheet could be made to pause at some stage during its advantage through the bending zone for such a length of time as to allow the trailing edge to be more efficiently heated than when continuously advancing the sheet through the bending zone. Alternatively, the sheet could be reversed in its path of travel within the bending zone before it was ever introduced into the initial cooling zone; this too would promote better heating of the original trailing edge. Another possibility is to effect continuous rotation of the sheet throughout the bending zone which would effect substantially equal heating of the two edges. Finally, the movement of the sheet could be arrested while the leading edge was in the initial cooling zone but the trailing edge still in the bending zone, again with the object of increasing the temperature of the trailing edge prior to introducing it into the initial cooling zone.

The suggested modes of controlling the movement of the sheet within the bending zone to increase the temperature of the trailing edge may, of course, be practised in conjunction with controlling the movement of the sheet within the initial cooling zone and annealing zone.

It will be appreciated that although some of the embodiments of the invention will tend to equalize the degree of toughness of the two edges of the sheet, this is not in itself particularly important. The object is to achieve a satisfactory degree of toughness of each edge and if this is achieved it is not important that one may be tougher than the other.

The invention will be described by way of illustration and without limitation with reference to the accompanying drawings in which:

FIGURE 1 is a longitudinal sectional view of a glass bending lehr.

FIGURE 2 is a side elevation of a glass bending mold;

FIGURE 3 is a plan view of the mold of FIGURE 2;

FIGURE 4 illustrates, on a larger scale, a detail of the mold of FIGURE 2;

FIGURE 5 is a plan view of an arrangement for effecting rotation of the mold of FIGURE 2 at a predetermined location in the path of travel of the mold through the lehr of FIGURE 1;

FIGURES 6 and 7 are plan views similar to FIGURE 5, but at later stages during the travel of the mold of FIGURE 2 through the bending lehr of FIGURE 1; and FIGURE 8 is a side elevational view looking in the direction of the arrows VIII—VIII of FIGURE 5.

FIGURE 1 shows a glass bending lehr 1 of a conventional type which is subdivided into a preheating zone 2, a bending zone 3, a cooling zone 4 and an annealing zone 5. The lehr 1 comprises a tunnel-like enclosure bounded by side walls 6, a roof 7 and a base 8 all of refractory material. Partition walls 9 extend downwardly from the roof 7 to define a lehr inlet 10 and a lehr outlet 11 and to separate the zones 2, 3, 4 and 5 from one another. Overhead heating elements 12 are disposed upon the inner surface of the roof 7 and are controlled to maintain the temperatures in the various zones of the lehr at the desired temperatures. Within the bending zone 3 additional heaters 13 are provided. These are disposed upon the side walls 6 of the lehr and cooperate with the overhead heaters 12 in the bending zone 3 to maintain the temperature in that zone at or above the bending temperature. A stub roll conveyor 14 extends through the lehr 1 and serves for carrying assemblies 15 of glass sheets and bending molds through the lehr.

Such an assembly 15 is illustrated in FIGURES 2 and 3. It comprises a generally rectangular support frame 16 made up of side rails 17 and end rails 18. A reinforcing rail 19 extends transversely between the two side rails 17 substantially centrally of the support frame 16. The support frame 16 rests on the rolls of the stub roll conveyor 14 which transports the assembly 15 through the lehr.

The shaping surface proper is constituted by the upper edges of two curved rails 20 joined together at their ends. The curvature defined by the shaping surface presented by the curved rails 20 corresponds to that desired in the bent glass sheet. FIGURE 2 shows the manner in which a flat glass sheet 21 is initially mounted on the mold. When subjected to bending temperatures in the bending zone 3 of the lehr 1 the sheet 21 sags downwardly under the influence of gravity until it is in contact with the whole of the skeleton shaping surface provided by the upper edges of the curved rails 20.

In order to ensure rigidity of the shaping surface, the curved rails are secured to one another by means of transversely extending reinforcing rails 22 and 22a. A cylindrical rod 23 is secured to the lower face of the reinforcing rail 22a and extends downwardly therefrom (see FIGURE 4). The rod 23 is provided with a shoulder 23a and with a portion 24 of reducing diameter which projects through a cylindrical aperture 25 in a bushing 19a mounted in the reinforcing rails 19 and which is threaded to receive a pair of lock nuts with inter-position of a washer 26a. Thus, the weight of the shaping surface and the glass sheet is supported entirely by the rod 23, the shoulder 23a of which rests on the upper surface of the bushing 19a. When forming the assembly 15 the nut 26 is not fully tightened and accordingly it is possible for the reduced portion 24 of the rod 23 to turn within the aperture 25. In this manner it is arranged that the shaping surface provided by the curved rails 20 can be rotated, about the axis of the rod 23, relative to the support frame 16.

The assemblies 15 are introduced into the lehr 1 in the usual manner. They pass through the preheating zone 2 wherein the glass is raised to a temperature approaching or equal to the bending temperature. From the preheating zone 2 they pass into the bending zone 3 wherein the temperature is maintained at or above the bending temperature as a result of which the glass softens and sags downwardly until it contacts the upper edges of the shaping rails 20. The speed of the stub roll conveyor 14 is controlled in such a manner that as soon as bending as been completed the assemblies 15 are moved from the bending zone 3 into the cooling zone 4. Within the cooling zone 4 the temperature is maintained at a much lower value than that prevailing in the bending zone 3. This is to effect as rapid a chilling as possible of the glass sheets so as to avoid the danger that they will sag more than is desirable, i.e., that overbending will occur. As soon as the assembly 15 enters the cooling zone 4 the leading edge of the bent glass sheet is subjected to a sudden chilling.

Up to this point the procedure differs in no way from traditional bending methods. However, according to the invention, the assembly 15 is not simply caused to pass through the cooling zone 4 but instead is subjected to rotation while within this zone. In the embodiment described, rotation of the shaping surface, together with the glass sheet, through an angle of 180° is effected shortly after entry of the assembly 15 into the cooling zone 4. This is carried out manually by inserting a bar through a port 27 on one of the side walls 6 of the lehr and applying pressure to the side faces of the curved rails 20. The shaping surface and the sheet are rotated through an angle of about 180° so that the original leading edge of the glass sheet becomes the trailing edge and the original trailing edge becomes the leading edge. When this has been accomplished the assembly 15 is allowed to pass through the remainder of the lehr in the usual way.

Because the original leading edge is subjected to a severe degree of chilling immediately upon passage of the assembly 15 into the cooling zone 4 it is initially toughened to a much greater extent than the remainder of the sheet and particularly than the original trailing edge. However, after rotation has been effected, the original trailing edge, which has now become the leading edge, is from then on subjected to a greater degree of chilling than the original leading edge. Although this chilling is at all times less severe than that experienced by the original leading edge immediately upon its entry into the cooling zone 4 the fact that the original trailing edge is subjected for a longer period of time to a faster rate of chilling tends to effect a compensating action. The end result is therefore the production of a sheet having a pair of edges which have been toughened to substantially the same extent. If it is found that the original trailing edge actually becomes tougher than the original leading edge because of having been made the leading edge for the greater part of the time that the assembly 15 remains in the cooling zone 4 a second rotation of the shaping surface and the glass sheet is effected while they are still within the cooling zone 4. This can be accomplished manually by introducing a bar through a second port 28.

The ports 27 and 28 are provided with doors which can be temporarily opened while the rotation of the shaping surface and the sheet is being effected and closed when this has been achieved.

It will be appreciated that the arrangement shown in FIGS. 1 to 4 is merely an example of the method of the invention and that many variations are feasible. For example, it is possible to arrange that rotation of the shaping surface and the sheet is automatically effected by means of cam members projecting from the walls 6 of the lehr. This would avoid any danger of disturbing the atmosphere within the cooling zone 4 by intake of cold air through the ports 27 and 28. If desired, cam arrangements can be provided for ensuring that the shaping surface and the glass sheet rotate continuously while passing through the bending zone 4.

FIGS. 5 to 8 illustrate an arrangement where cam members are used to effect rotation of the shaping surface and sheet through an angle of 180°. The mold of FIGS. 1 to 4 is modified in that there is secured to the rod a triangular plate 29 on which a pair of freely rotatable rollers 30 and 31 are pivotally mounted. The lehr of FIG. 1 is modified by the provision of a pair of cam members 32 and 33 projecting from one of the side walls 6 into the lehr. The ports 27 and 28 are dispensed with. The location of the cam members 32 and 33 correspond substantially to the location of the port 27 and the cam members project into the lehr for such a distance as to lie within the path of the rollers 30 and 31 but not to impede passage of the rod 23 or any other part of the assembly 15. Cam surfaces 32a and 33a are provided on the cam members 32 and 33 respectively.

When the assembly 15 is initially introduced into the lehr the rollers 30 and 31 are disposed as indicated in FIG. 5 where the line T designates the path of travel of the assembly 15 through the lehr. Immediately after entry of the assembly 15 into the cooling zone 4, i.e., immediately after the initial severe chilling of the original leading edge, the roller 31 encounters the cam surface 32a of the cam member 32. This exerts a turning force on the triangular plate 29 and hence on the rod 23. Since it is rotatably mounted the roller 30 rides smoothly along the cam surface 32a until it finally passes off innermost part thereof. At that point the rod 23 (and therewith the shaping surface and the glass sheet) has been rotated through an angle of 90° as shown in FIG. 6. This brings the roller 31 into such a position as to be engaged by the cam surface 33a of the cam member 33. Rotation of the rod 23 through a further angle of 90° is then effected by the cooperation of the roller 31 and the cam surface 33a as illustrated in FIG. 7. The end result is that the shaping surface and the glass sheet are rotated through an angle of 180° without manual attention being necessary.

It will also be understood that when working with glass sheets of large size and weight, and particularly when bending pairs of glass sheets to be used for the formation of laminated articles, the use of a simple pivot of the type constituted by the rod 23 may be impractical because apart from the undesirability of supporting a large weight by such means, the frictional forces may be so great that rotation of the glass shaping surface and the sheet would be difficult to achieve manually. However, in such cases it would be feasible to support the rod 23 on a thrust bearing or to provide additional support, for example by means of rollers pivotally mounted on arms extending downwardly from the shaping surface and movable along a circular track carried by the support frame 16. Alternatively, it would be feasible to arrange that the shaping surface is rigidly secured to a support frame such as the support frame 16 and the whole assembly of shaping surface and support frame is provided with means for being rotated relative to the lehr 1. This could be facilitated by arranging that the cooling zone is V-shaped or U-shaped, the rotation of the assembly being then associated with a change of direction of movement.

It was mentioned above that the benefits of the method of the present invention do not necessarily involve rotation of the sheet, and that the desired increase of rate of cooling of the trailing edge of the sheet can be achieved by returning the sheet or a portion thereof to the bending zone shortly after it has entered the annealing zone. The apparatus of the prior art can be modified to make it suitable for carrying out such a method. It is necessary to provide that a section of the conveyor extending through the bending and annealing zones is capable of being reversibly driven. For example, if it was desired to use the lehr of FIGURE 1 in this embodiment of the method, a section of the stub roll conveyor 14 spanning the bending zone 3 and the cooling zone 4 would be constructed so as to be capable of forward or reverse drive at will. The ports 27 and 28 would not be required and it would not be necessary to use a mold structure in which the shaping surface can be rotated relative to the walls of the lehr.

I claim:

1. In a method of bending a glass sheet which comprises supporting a sheet on a shaping surface and passing the assembly of the sheet and the shaping surface through a heating and bending zone heated sufficiently to cause bending of the glass sheet, an initial cooling zone and an annealing zone, the improvement of increasing the compressive stress of the trailing edge of the sheet of glass over the stress which would naturally occur by moving the sheet successively through said zones which improvement comprises returning at least the original trailing edge portion of the sheet to the bending zone after the sheet has entered the initial cooling zone and holding the sheet in the bending zone for a length of time sufficient to reheat the trailing edge of the sheet, then returning the sheet to said initial cooling zone.

2. In a method of bending a glass sheet which comprises supporting the sheet on a shaping surface and passing the assembly of the sheet and the shaping surface successively through a bending zone, an initial cooling zone and an annealing zone, the improvement of increasing the compressive stress of the trailing edge of the sheet of glass over the stress which would naturally occur by moving the sheet at a constant speed comprising rotating the said sheet about a vertical axis through an angle of at least 180° whereby the original trailing edge becomes the leading edge and maintaining the rotated position of the glass sheet while it is within said initial cooling zone to expose the original trailing edge of the sheet to cooling conditions substantially equivalent to the cooling conditions to which the original leading edge is exposed.

3. The method according to claim 2 wherein the said 180° rotation is repeated at intervals while the sheet is being moved through said initial cooling zone and said annealing zone.

4. In a method of bending a glass sheet which comprises supporting a sheet on a shaping surface and passing the assembly of the sheet and the shaping surface successively through a bending zone, an initial cooling zone and an annealing zone, the improvement of increasing the compressive stress of the trailing edge of the sheet of glass over the stress which would naturally occur by moving the sheet at a constant speed which comprises causing the assembly to pause during its movement through the bending zone for a period of time sufficient to raise the trailing edge of the sheet to a higher temperature than would be achieved by continuously advancing the sheet at a constant rate through said bending zone while maintaining the original leading edge of the sheet as the leading edge throughout the entire bending zone.

5. In a method of bending a glass sheet which comprises supporting a sheet on a shaping surface and passing the assembly of the sheet and the shaping surface successively through a bending zone maintained at a temperature sufficient to promote bending of the supported glass, an initial cooling zone and an annealing zone, the improvement of increasing the compressive stress of the trailing edge of the sheet of glass over the stress which would naturally occur by moving the sheet at a constant speed which comprises reversing the movement of said assembly part way through the bending zone, moving the assembly backwardly within said bending zone for a period of time sufficient to raise the temperature of the original trailing edge relative to the original leading edge, and then restoring the original direction of movement of said assembly to pass it from said bending zone into said initial cooling zone.

6. In a method of bending a glass sheet which comprises supporting a sheet on a shaping surface and passing the assembly of the sheet and the shaping surface successively through a bending zone, an initial cooling zone and an annealing zone, the improvement of increasing the compressive stress of the original trailing edge of the sheet of glass over the stress which would naturally occur by moving the sheet as a constant speed which comprises effecting continuous rotation of said sheet during its passage through said bending zone to raise the temperature of said original trailing edge to substantially the same temperature as the original leading edge of the sheet prior to introduction of the sheet into the initial cooling zone.

7. In a method of bending a glass sheet which comprises supporting a sheet on a shaping surface and passing the assembly of the sheet and the shaping surface successively through a bending zone, an initial cooling zone and an annealing zone, the improvement of increasing the compressive stress of the trailing edge of the sheet of glass over the stress which would naturally occur by moving the sheet at a constant speed which comprises arresting the movement of said sheet while the original leading edge thereof is within said initial cooling zone and while the original trailing edge thereof is within said bending zone, maintaining the sheet in that position to allow additional heating of said trailing edge and then recommencing movement of said sheet to bring said trailing edge into said initital cooling zone.

8. In a method of bending a glass sheet which comprises supporting a sheet on a shaping surface and passing the assembly of the sheet and the shaping surface successively through a bending zone, an initial cooling zone and an annealing zone, the improvement of increasing the compressive stress of the trailing edge of the sheet of glass over the stress which would naturally occur by moving the sheet at a constant speed which comprises effecting continuous rotation of said sheet during its passage through all of said zones to subject both the original trailing and leading edges of the sheet to substantially equivalent heat transfer conditions throughout all the zones.

References Cited

UNITED STATES PATENTS

| | | | |
|---|---|---|---|
| 2,886,922 | 5/1959 | Yando | 65—107 |
| 3,216,814 | 11/1965 | Shaffer | 65—107 X |
| 3,278,287 | 10/1966 | Leflet et al. | |
| 3,278,289 | 10/1966 | Humes | 65—107 X |

DONALL H. SYLVESTER, *Primary Examiner.*

A. D. KELLOGG, *Assistant Examiner.*